P. Shaw,

Air Engine.

No. 1,176. Reissued Apr. 23, 1861.

Witnesses.

Thos. R. Roach

H. Schumacher

Inventor.

Philander Shaw

UNITED STATES PATENT OFFICE.

PHILANDER SHAW, OF BOSTON, MASSACHUSETTS.

IMPROVEMENT IN AIR-ENGINES.

Specification forming part of Letters Patent No. 10,868, dated May 2, 1854; Reissue No. 1,014, dated July 17, 1860; Reissue No. 1,176, dated April 23, 1861.

*To all whom it may concern:*

Be it known that I, PHILANDER SHAW, of Boston, in the county of Suffolk and State of Massachusetts, have invented certain Improvements in Hot-Air Engines, of which the following is a full, clear, and exact description, reference being had to the accompanying drawings, making part of this specification, in which—

Figure 1:
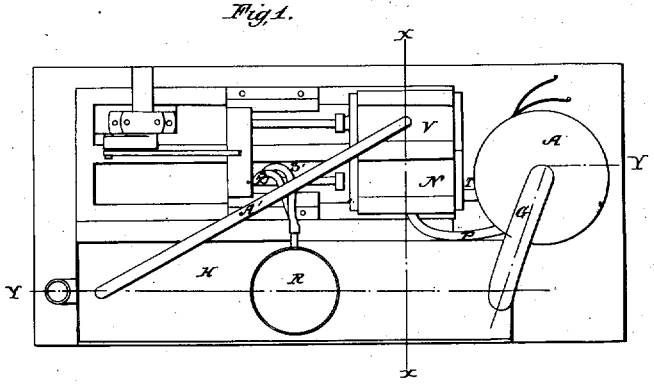
Figure 2:
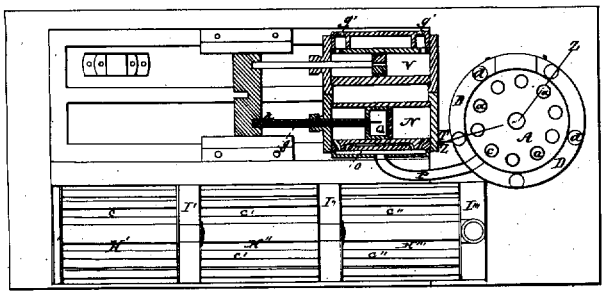
Figure 4:
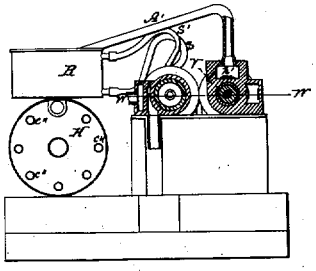
Figure 5:
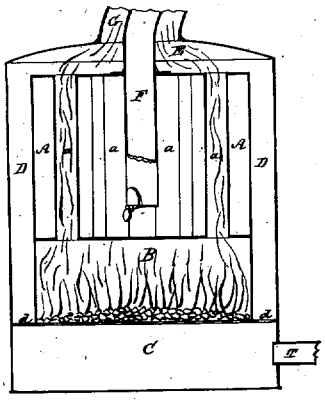
Figure 3:
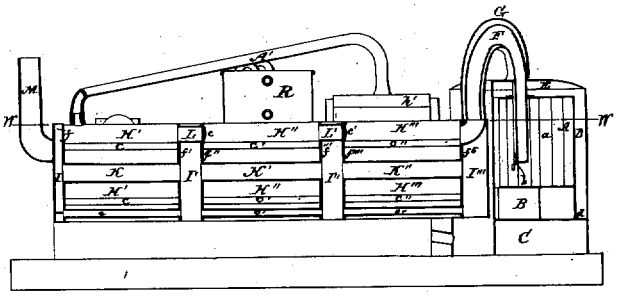

Figure 1 is a plan of the engine; Fig. 2, a section on the line W W of Figs. 3 and 4, the shell of the auxiliary heater being removed to show the parts within; Fig. 3, a section on the line Y Y of Fig. 1; Fig. 4, a section on the line X X of Fig. 1; Fig. 5, an enlarged section of the main heater on Z Z of Fig. 2.

My invention consists, first, in the employment of an auxiliary heater the different sections of which are so connected together by means of valves that the air for the supply of the engine shall be pumped in against the minimum pressure within the main heater, while it is worked off against the maximum pressure, the exhaust air from the cylinder, together with the smoke and heated gases from the furnace, passing through the auxiliary heaters in one direction, while the air for the supply of the engine is caused to pass in the contrary direction through tubes within these auxiliary heaters, by which means the heat is extracted from the exhaust air and smoke and transferred to the air on its way from the air-pump to the heater.

My invention consists, secondly, in passing the air which propels the piston, or a portion thereof, directly through the fire, for the purpose of economizing heat, as will hereinafter be more fully described.

My invention consists, thirdly, in the employment of a tight ash-pit, into which the air for the support of combustion within the furnace is forced, in connection with a chamber communicating with the ash-pit and surrounding the furnace, for the passage of a portion of the air not required by the fire, whereby I am enabled not only to urge my fire with a hot-blast and to employ so much of the exhaust air for this purpose as may be necessary, but also to pass the balance, together with the products of combustion, through the auxiliary heater, and to make use of it as a means to prevent the radiation of heat from the furnace, thereby effecting a great saving of heat, and a consequent economy in the working of the engine.

My invention consists, fourthly, in refrigerating the piston by means of a constant stream of cold water, which is made to circulate through its interior, and thus preserve it at a temperature not exceeding that of boiling water, whereby the great inconveniences which have heretofore been experienced in the working of hot-air engines, arising from the difficulty of obtaining a packing that will resist the great temperature to which the piston is exposed, are avoided.

To enable others skilled in the art to understand my invention, I will proceed to describe the method which I have adopted of carrying it out.

In the accompanying drawings, A represents the main heater, into which the air is received from the auxiliary heaters, and in which it receives a final heating preparatory to being admitted to the working-cylinder.

B is the fire-box, beneath which is a tight ash-pit, C. The smoke and burning gases from the furnace pass off by the vertical tubes *a* through the body of the heater. The fire-box and body of the heater are surrounded entirely by a chamber, D, which opens at the top into the chimney or smoke-box E, and communicates with the ash-pit through the openings *d* in the bottom plate, the object of which will be explained hereinafter.

F is an air-pipe of communication between the auxiliary and the main heaters, which is entirely surrounded by the smoke-flue G, and is furnished with a valve, *b*, opening downward at its lower extremity.

H is the auxiliary heater, which is divided into three sections or minor heaters, H′ H″ H‴. These sections are separated from each other and from the ends of the heater by chambers I I′ I″ I‴, formed by close-fitting partitions $f$ $f'$ $f''$ $f'''$ $f''''$ $f^5$, the chambers I I′ $I^2$ $I^3$ communicating with each other through the tubes $c$ $c'$ $c''$ K K′ K″.

The smoke from the furnace enters through the pipe G into the chamber I‴, thence it passes through the tubes $c''$ K″ into the chamber I″, thence through the tubes K′ $c'$ into the chamber I′, thence through the tubes K *c* into the chamber I, whence it passes off by the chimney M.

By the arrangement above explained it will be perceived that the compartments H′ H² H³ are entirely shut off from the chambers I I′ I″ I‴ and from the smoke-flues *c* and K, which pass through them. They, however, communicate with each other through the short tubes L L′. These tubes are fitted at their advance ends with valves *e e′*. The air from the force-pump is admitted into these compartments in succession, passing through the tubes L and L′ and the valves *e e′* in a manner which will be hereinafter more fully described.

N is the working-cylinder; O, the hot-air box, which communicates with the heater A through the pipe P. Q is the hollow piston, the piston-rod of which is also hollow, as seen in Fig. 2. *g* is a tube inclosed within the hollow piston-rod and penetrating it at about the point *h*. R is a receptacle for water. S S′ are india-rubber tubes from the top and bottom of this receptacle, which communicate, one with the interior of the hollow piston and the other with the small tube inclosed therein. By this means the water from the receptacle R is caused to circulate continually through the hollow piston, which is thus prevented from becoming injuriously heated, as before mentioned.

T is the discharge-pipe from the working-cylinder, which is made to enter the ash-pit C immediately beneath the grate-bars. All the advantages resulting from urging the fire with heated air are thus obtained. The excess of the exhust air not required by the fire passes through the openings *d* into the chamber D, which incases the furnace, and off with the heated gases and the products of combustion through the flue G into the chamber I³, whence they pass out in the manner already described. It will be seen that by means of this chamber D, surrounding the fire-box and heater and communicating at the top with the smoke box or flue and at the bottom with the tight ash-pit into which the exhaust air from the engine is thrown, several important advantages are secured:

First. Only so much of the exhaust air as is required for the combustion of the fuel is forced through the fire-box, whereby the fire is not needlessly urged, as would be the case were the entire volume of the exhaust air passed through the fire, an escape for the air from the fire-box being furnished through the openings *d*. The amount drawn through the fire is regulated by the requirements of the draft, the remainder passing off by the chamber D.

Second. The furnace and heater being entirely surrounded by the chamber D, which is filled with heated air, a great saving is effected of the heat which would otherwise be radiated from the furnace and heater, and as the chamber D communicates at the top with the smo -box E, not only is the fire urged with he d air and the radiation from the sides of the furnace prevented, but the air that has passed through the chamber D is again reunited with the products of combustion, and the whole subsequently refrigerated in the auxiliary heater by the air entering from the force-pump, as will be presently more fully explained, whereby a still further economy of heat is effected.

V is the force-pump for supplying the heater with air, the area of its piston being about one-half that of the working-piston. Air is admitted to this pump through the valves *g′* and escapes through valves in the top of the cylinder into the chamber *h′*, thence it passes by the pipe A′ into the compartment H′ of the auxiliary heater. Here it circulates around the outside of the smoke passages and tubes *c* K′, and passes (when the pressure is removed from the main heater in the manner which will be hereinafter explained) through the short communication-pipes L and valves *e* into the compartment H″. Here it again circulates around the smoke-pipes *c′* K′, and through the pipe L′ and valve *e′* into the compartment H‴. From this compartment it passes through the pipe F and valve *b* into the heater A. It is evident that the auxiliary heater may consist of one or more compartments, there being always a valve communication between the last of such compartments and the main heater.

Operation: The air within the main heater A, as it expands, closes the valve *b*, which thus prevents the air from returning through the pipe F into the auxiliary heater H. A charge is then admitted to the working-cylinder, the capacity of the heater A being such with relation to the working-cylinder that when cut off at three-fourths stroke, or thereabout, the pressure within the heater A shall be very much reduced. As soon as the pressure within the heater A is reduced below that within the compartment H‴, the valve *b* opens, and when the pressure within the heater A and the compartment H‴ is reduced below that of the compartment H″ the valve *c′* opens, and when the pressure falls below that within the compartment H′ the valve *e* opens. The expansion caused by the extreme heat within the heater A soon closes the valve *b*, the valves *c′ e* being in like manner closed, as the heat within the compartment H‴ is greater than that within H″, and so on, it being nearer to the furnace. The pressure within H′ thus always remains at very near the minimum, and as the air is pumped into this compartment it is evident that it is only resisted by this minimum pressure, while it is worked off from the main heater A at its maximum pressure.

The exhaust air from the cylinder, as before stated, enters the close ash-pit C, and the fire is thus urged by a hot-blast. That portion of the exhaust air not required by the fire passes off with the products of combustion, and is refrigerated in the auxiliary heater II by the entering air. The exhaust air may be made to enter the auxiliary heater with the smoke from the furnace, and thus a portion of the advantages above described will be secured; but I prefer the exhaust beneath the fire, for the reasons already set forth.

Several heaters and auxiliary heaters may be adapted to a single engine, a charge of air being taken from each in succession.

What I claim as my invention, and desire to secure by Letters Patent, is—

1. The within-described auxiliary heater, constructed and arranged as set forth, the exhaust air and the products of combustion being passed through in one direction, while the cold air from the force-pump is passed through in the other, by which means the heat is extracted from the heated air and smoke and transferred to the cold air on its way to the engine, the latter being pumped in against a pressure much less than that at which it is worked off from the main heater, as explained.

2. Passing the exhaust air which has propelled the piston directly through the fire, for the purpose of economizing heat, as set forth.

3. In combination with a tight ash-pit, into which the air for the support of combustion within the furnace is forced, a chamber, D, communicating with the ash-pit and surrounding the furnace, for the passage of a portion of the air not required by the fire, which, combining with the products of combustion in the chamber E, passes off through the flue G, for the purpose of economizing heat, as set forth.

4. I do not claim refrigerating the cylinder or piston of hot-air or other engines by means of cold water, but I do claim the arrangement, herein described, of the tubes within the piston-rod, the reservoir R, and the india-rubber tubes S S′, for the purpose set forth.

PHILANDER SHAW.

Witnesses:

SAM. COOPER,

P. E. TESCHEMACHER.